(12) United States Patent
Tsuji et al.

(10) Patent No.: US 10,625,477 B2
(45) Date of Patent: Apr. 21, 2020

(54) REINFORCING FIBER SHEET MANUFACTURING APPARATUS

(71) Applicant: Toray Industries, Inc., Tokyo (JP)

(72) Inventors: Haruhiko Tsuji, Otsu (JP); Tamotsu Suzuki, Otsu (JP); Yasumoto Noguchi, Otsu (JP); Yasuhiro Sato, Otsu (JP)

(73) Assignee: Toray Industries, Inc., Tokyo (JP)

( * ) Notice: Subject to any disclaimer, the term of this patent is extended or adjusted under 35 U.S.C. 154(b) by 238 days.

(21) Appl. No.: 15/513,573

(22) PCT Filed: Sep. 24, 2015

(86) PCT No.: PCT/JP2015/004857
§ 371 (c)(1),
(2) Date: Mar. 23, 2017

(87) PCT Pub. No.: WO2016/047141
PCT Pub. Date: Mar. 31, 2016

(65) Prior Publication Data
US 2017/0291377 A1    Oct. 12, 2017

(30) Foreign Application Priority Data
Sep. 25, 2014  (JP) .................. 2014-194593

(51) Int. Cl.
*B29C 70/54* (2006.01)
*B29C 70/38* (2006.01)
*B32B 37/00* (2006.01)

(52) U.S. Cl.
CPC .......... *B29C 70/545* (2013.01); *B29C 70/382* (2013.01); *B32B 37/0046* (2013.01); *B29C 2793/0027* (2013.01)

(58) Field of Classification Search
CPC ............... B29C 70/545; B29C 70/382; B29C 2793/0027; B32B 37/0046
See application file for complete search history.

(56) References Cited

U.S. PATENT DOCUMENTS

2004/0026025 A1   2/2004  Sana et al.
2007/0234907 A1  10/2007  Torres Martinez
(Continued)

FOREIGN PATENT DOCUMENTS

DE           3040838        5/1982
JP       2002-307379 A    10/2002
(Continued)

OTHER PUBLICATIONS

Notice of Reasons for Refusal dated May 21, 2019, of counterpart Japanese Application No. 2015-550510, along with an English translation.

(Continued)

*Primary Examiner* — Mark A Osele
*Assistant Examiner* — Christopher C Caillouet
(74) *Attorney, Agent, or Firm* — DLA Piper LLP (US)

(57) ABSTRACT

A reinforcing fiber sheet manufacturing apparatus configured to place a reinforcing fiber bundle on a table includes a fiber bundle supply mechanism configured to feed the reinforcing fiber bundle and equipped with a fiber bundle pressing portion that is configured to press the reinforcing fiber bundle against the table; and a cutting blade located independently of the fiber bundle supply mechanism and configured to cut the reinforcing fiber bundle that is pressed by the fiber bundle pressing portion.

14 Claims, 6 Drawing Sheets

(56) References Cited

U.S. PATENT DOCUMENTS

2009/0151865 A1* 6/2009 Martinez ............ B29C 35/0266
156/273.7
2009/0266485 A1 10/2009 Torres Martinez

FOREIGN PATENT DOCUMENTS

| | | |
|---|---|---|
| JP | 2008-508435 A | 3/2008 |
| JP | 2009-292002 A | 12/2009 |
| JP | 2010-018923 A | 1/2010 |
| JP | 2010-18923 A | 1/2010 |
| JP | 2010-500191 A | 1/2010 |
| JP | 2011-57767 A | 3/2011 |
| JP | 2011-515242 A | 5/2011 |
| JP | 2011-168009 A | 9/2011 |
| WO | 2009/108517 A1 | 9/2009 |

OTHER PUBLICATIONS

The Third Office Action dated Aug. 13, 2019, of counterpart (Chinese Application No. 201580051373.4, along with an English translation.

* cited by examiner

REINFORCING FIBER SHEET MANUFACTURING APPARATUS

TECHNICAL FIELD

This disclosure relates to a reinforcing fiber sheet manufacturing apparatus used to manufacture a fiber-reinforced plastic.

BACKGROUND

A variety of methods have been known as a method of producing a preform of a reinforcing fiber such as a glass fiber or a carbon fiber used for manufacture of a fiber-reinforced plastic. For example, a known method cuts out a predetermined cut pattern from a fabric such as a woven fabric base material of reinforcing fiber and produces a preform by pressing the cut pattern. That method, however, causes a residual part of the woven fabric base material after cutting out the cut pattern to be wasted. This causes a problem of decreasing the yield in production of the preform and increasing the production cost of the preform.

To avoid this problem, AFP (automated fiber placement) and TFP (tailored fiber placement) methods have been known with a view to placing reinforcing fibers in only required locations and reducing the waste of reinforcing fibers. For example, as shown in FIG. 1, JP 2011-57767 A discloses a method that places strands of a reinforcing fiber mixed with a binder (reinforcing fiber bundle 14) on a preform-forming tool by a movable accumulation head 2 and sequentially repeats this placement operation upward to form a plurality of layers and produce a preform. JP 2011-515242 A discloses a method that places a plurality of parallel composite tape strips in only required locations while moving an automated fiber placement head on a base plate, as the method of forming a composite layered product on the base plate.

The above techniques, however, have two problems. In an apparatus that employs either of the methods of JP '767 and JP '242 described above, for example, as shown in FIG. 1, a cutting mechanism 11 configured to cut a reinforcing fiber bundle 14 is mounted in a head 2 configured to supply the reinforcing fiber bundle 14. The first problem is accordingly that the reinforcing fiber bundle is cut while being separated from the head at a high speed.

Continuously applying a force such as shear force at one point of a cutting object is generally required for cutting. When the cutting object moves at a high speed, however, there is a difficulty in ensuring a sufficient time period to apply the force at one point. This results in a difficulty in cutting. To solve this problem, the time period required for cutting should be minimized, and cutting should be completed instantaneously. For this purpose, there is a need to maximize the above force. For example, in cutting by shearing, it is required to maximize the shear force to increase the operation speed of a shear blade and apply a sufficient force for shearing in a short time period. The configuration that the cutting mechanism is mounted in the head, however, provides the structural restriction including the size, the weight and the location. Additionally, increasing the shear capacity results in increasing the equipment cost. There is thus naturally a limit on maximizing the shear force.

Especially the reinforcing fiber is likely to be not readily cut. Additionally, a plurality of fibers are likely to be handled at a time, with a view to increasing the production capacity of the apparatus. Both these factors significantly increase the time period required for cutting. It is accordingly difficult to complete cutting instantaneously.

Furthermore, moving the reinforcing fiber bundle during cutting causes a slight difference in cutting timing. Even when the reinforcing fiber bundle is cut at identical timings, this causes a difference in cutting position. When there is a difference in cutting position, a margin is set in expectation of a potential difference. Setting the margin, however, provides a need for trimming to a predetermined final shape. This increases the waste of reinforcing fiber and causes a low yield.

It could therefore be helpful to decrease the moving speed of the reinforcing fiber bundle during cutting of the reinforcing fiber bundle. This requires deceleration or stopping of the head to thereby cause reduction of the production capacity.

The second problem of the techniques disclosed in JP '767 and JP '242 is as follows. As shown in FIG. 1, a pressing roller 6 configured to place the reinforcing fiber bundle 14 is provided at an end of the head 2 configured to supply the reinforcing fiber bundle. It is required to feed a portion of the reinforcing fiber bundle 14 upstream of the cutting mechanism 11 to the pressing roller 6 every time the reinforcing fiber bundle 14 is cut off. In both the apparatuses of JP '767 and JP '242, as shown in FIG. 1, the cutting mechanism 11 for the reinforcing fiber bundle 14 is placed on the front side of the end of the head 2 where the pressing roller 6 is provided, i.e., on the slightly upstream side of the end of the head that corresponds to the most downstream side of the reinforcing fiber bundle 14 in the viewpoint of the moving direction of the reinforcing fiber bundle 14. When the reinforcing fiber bundle 14 is cut in this configuration, a portion of the reinforcing fiber bundle 14 downstream of the cutting position of the reinforcing fiber bundle 14 is fully placed on the forming tool or the base plate by the pressing roller 6. This causes no reinforcing fiber bundle 14 to be present from the cutting position of the reinforcing fiber bundle 14 in the head 2 to the end of the head 2. To repeat the operation of placing the reinforcing fiber bundle 14 on the forming tool or the base plate, there is accordingly a need to feed the reinforcing fiber bundle 14 to the end of the head 2 by some method. This method may be, for example, a method of feeding the reinforcing fiber bundle by nip rolls or a method of sucking and pulling the reinforcing fiber bundle by the air. Both the apparatuses of JP '767 and JP '242 are equipped with a mechanism of feeding the reinforcing fiber bundle. This mechanism increases the equipment cost and also decreases the production capacity due to a need for an extra time for feeding the reinforcing fiber bundle.

SUMMARY

We provide:
(1) A reinforcing fiber sheet manufacturing apparatus configured to place a reinforcing fiber bundle on a table. The reinforcing fiber sheet manufacturing apparatus comprises: a fiber bundle supply mechanism configured to feed the reinforcing fiber bundle and equipped with a fiber bundle pressing portion that is configured to press the reinforcing fiber bundle against the table; and a cutting blade located independently of the fiber bundle supply mechanism and configured to cut the reinforcing fiber bundle that is pressed by the fiber bundle pressing portion. The reinforcing fiber sheet manufacturing apparatus of this aspect enables the reinforcing fiber bundle to be cut efficiently.

(2) The fiber bundle pressing portion may be a roller configured to move closer to and farther from the table. The reinforcing fiber sheet manufacturing apparatus of this aspect enables the reinforcing fiber bundle to be cut efficiently.

(3) The cutting blade may be fixed at an arbitrary position on the table. The reinforcing fiber sheet manufacturing apparatus of this aspect enables the reinforcing fiber bundle to be cut efficiently.

(4) The cutting blade may be mounted on a cutting mechanism configured to be movable to an arbitrary position on the table. The reinforcing fiber sheet manufacturing apparatus of this aspect enables the reinforcing fiber bundle to be cut efficiently.

(5) The reinforcing fiber sheet manufacturing apparatus may further comprise a plurality of slider mechanisms configured to independently move the fiber bundle supply mechanism and the cutting blade to be approximately parallel to each other. The reinforcing fiber sheet manufacturing apparatus of this aspect enables the reinforcing fiber bundle to be cut efficiently.

(6) The table may be configured to be movable. The reinforcing fiber sheet manufacturing apparatus of this aspect enables the reinforcing fiber bundle to be cut efficiently.

(7) The reinforcing fiber sheet manufacturing apparatus may further comprise an air suction unit configured to fix the reinforcing fiber bundle on the table. The reinforcing fiber sheet manufacturing apparatus of this aspect enables the reinforcing fiber bundle to be cut efficiently.

(8) The reinforcing fiber sheet manufacturing apparatus may further comprise an electrostatic attraction unit configured to fix the reinforcing fiber bundle on the table. The reinforcing fiber sheet manufacturing apparatus of this aspect enables the reinforcing fiber bundle to be cut efficiently.

(9) The reinforcing fiber sheet manufacturing apparatus may further comprise an adhesive material placed between the table and the reinforcing fiber bundle. The reinforcing fiber sheet manufacturing apparatus of this aspect enables the reinforcing fiber bundle to be cut efficiently.

(10) The reinforcing fiber sheet manufacturing apparatus may further comprise a heating unit configured to melt a heat fusion material adhering to a surface of the reinforcing fiber bundle and heat-fuse and fasten the heat fusion material to the table. The reinforcing fiber sheet manufacturing apparatus of this aspect enables the reinforcing fiber bundle to be cut efficiently.

(11) The reinforcing fiber sheet manufacturing apparatus may further comprise a conveyor belt placed on the table. The reinforcing fiber sheet manufacturing apparatus of this aspect enables the reinforcing fiber bundle to be cut efficiently.

(12) A reinforcing fiber sheet manufacturing apparatus is configured to place an arbitrary length of a reinforcing fiber bundle fed by a fiber bundle supply mechanism, at an arbitrary position on a table. The fiber bundle supply mechanism comprises a fiber pressing portion configured to press the reinforcing fiber bundle against the table. A cutting blade configured to cut the reinforcing fiber bundle pressed by the fiber pressing portion is provided on the table.

The reinforcing fiber sheet manufacturing apparatus thus enables the reinforcing fiber bundle to be cut efficiently.

Figure 1:
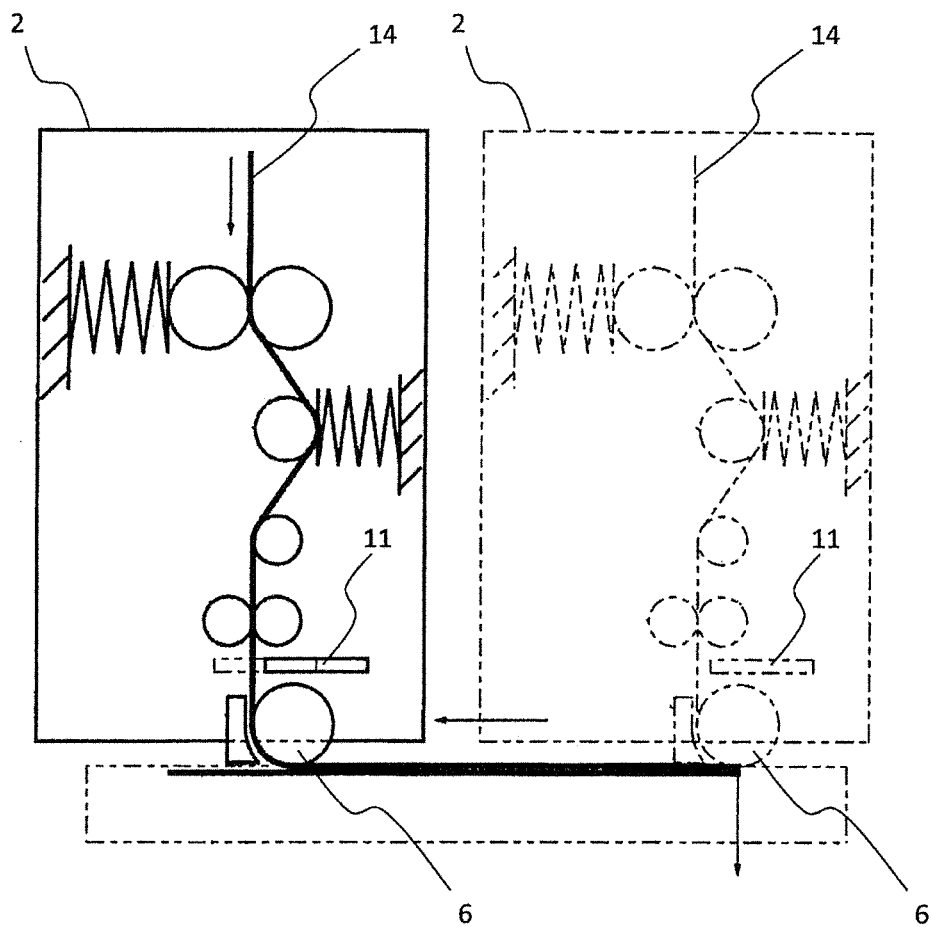
FIG. 1 is a schematic configuration diagram illustrating a fiber bundle supply mechanism disclosed in JP '767.

REFERENCE SIGNS LIST 1 reinforcing fiber sheet manufacturing apparatus
2 fiber bundle supply mechanism
3 table base
4 moving table
5 slider mechanism
6 pressing roller
7 pressing mechanism
9 nip roll
10 fiber bundle guide
11 cutting mechanism
12 low head die cutter
13 guide rail
14 reinforcing fiber bundle
15 reinforcing fiber sheet
16 suction table
17 reinforcing fiber bobbin
18 accumulation mechanism
19 camera
20 nip mechanism
30 electrostatic attraction unit

DETAILED DESCRIPTION

The following describes an example with reference to the drawings. This disclosure is, however, not at all restricted by the drawings. The operations of a reinforcing fiber sheet manufacturing apparatus 1 are described first with reference to FIGS. 2 and 3, and the respective components of the reinforcing fiber sheet manufacturing apparatus 1 are then described with reference to FIGS. 4 and 5.

Figure 2:
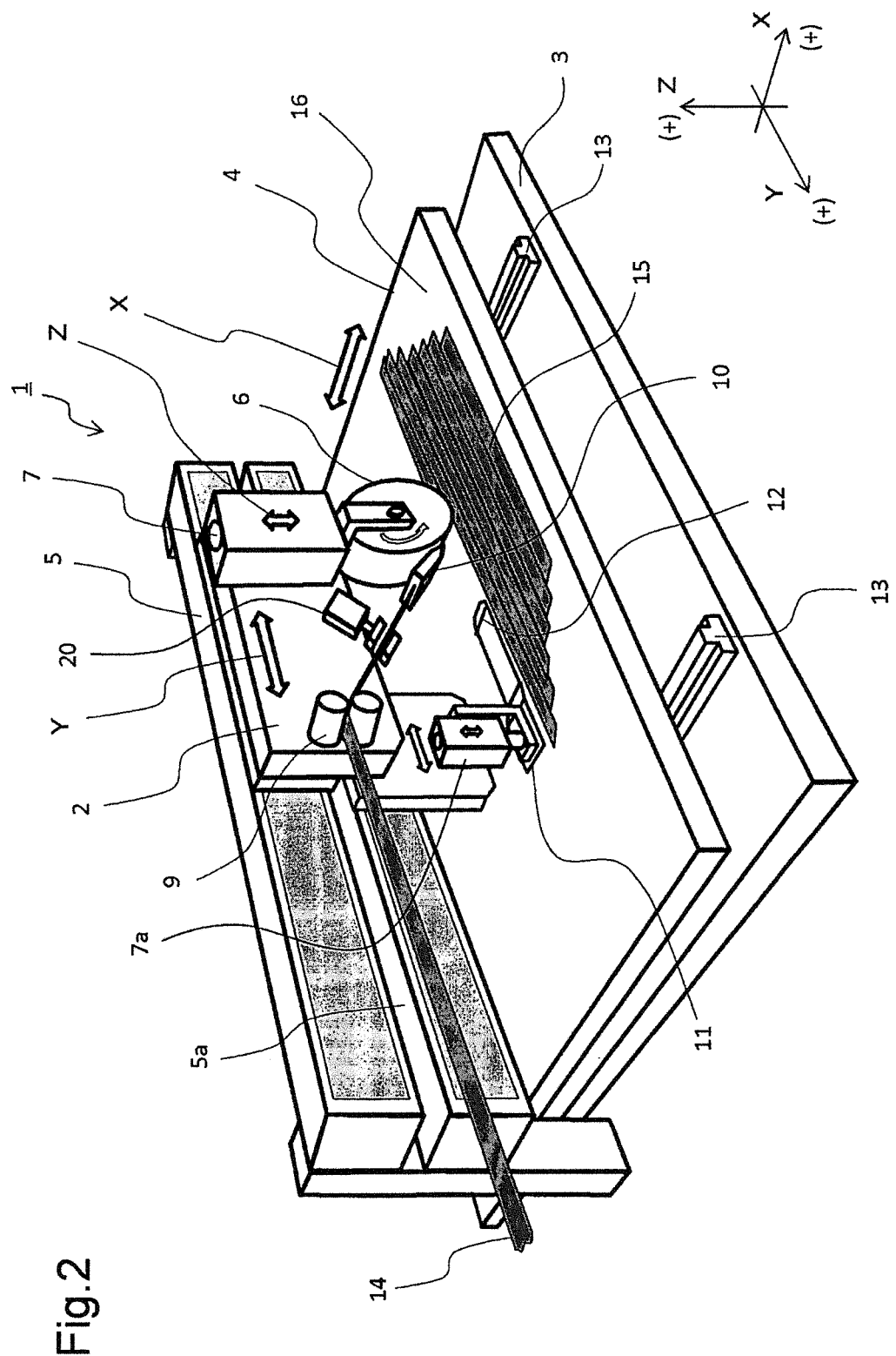
FIG. 2 is a schematic configuration diagram illustrating a reinforcing fiber sheet manufacturing apparatus according to an example.
Figure 3:
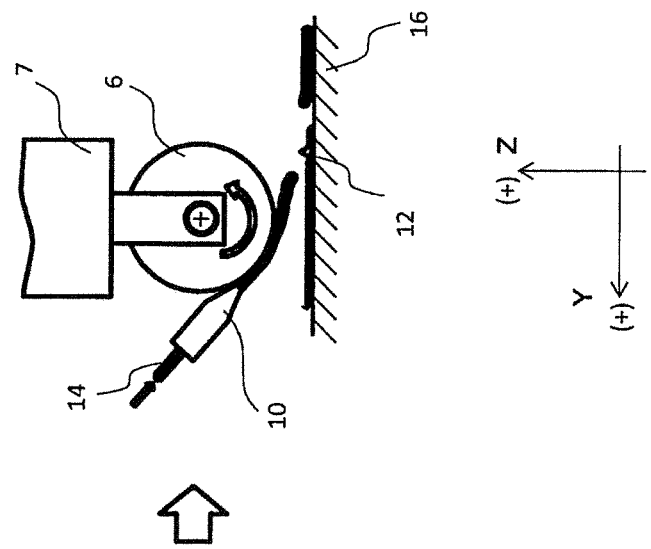
FIGS. 3A to 3C are partial enlarged views illustrating a process of cutting a reinforcing fiber bundle according to the example.

FIG. 2 illustrates the general configuration of the reinforcing fiber sheet manufacturing apparatus 1 according to one example. XYZ axes orthogonal to one another are shown in FIG. 2. An X-axis direction indicates a depth direction of the reinforcing fiber sheet manufacturing apparatus 1. A Y-axis direction indicates a width direction of the reinforcing fiber sheet manufacturing apparatus 1. A Z-axis direction indicates a vertical direction. The reinforcing fiber sheet manufacturing apparatus 1 may include a fiber bundle supply mechanism 2, a table base 3, a moving table 4, a slider mechanism 5, a pressing roller 6, a pressing mechanism 7, nip rolls 9, a fiber bundle guide 10 and a cutting mechanism 11. A reinforcing fiber bundle 14 denotes a fiber bundle consisting of carbon fibers. The reinforcing fiber bundle 14 may consist of another material, for example, glass fibers, ceramic fibers or aramid fibers.

As shown in FIG. 2, the reinforcing fiber bundle 14 running through the nip rolls 9 is held by a nip mechanism 20 and is pulled out to an arbitrary position when the fiber bundle supply mechanism 2 is moved in a negative direction of the Y axis by the slider mechanism 5. At this time, the pressing roller 6 serving as the fiber bundle pressing portion is moved up in a positive direction of the Z axis by the pressing mechanism 7. Holding of the reinforcing fiber bundle 14 by the nip mechanism 20 is then released, and the pressing roller 6 is moved down in a negative direction of the Z axis and is pressed against a suction table 16. The fiber bundle supply mechanism 2 is subsequently moved in a positive direction of the Y axis by the slider mechanism 5 to start placement of the reinforcing fiber bundle 14 on the suction table 16. The fiber bundle guide 10 serves to keep the positional accuracy in the X-axis direction of the reinforcing fiber bundle 14 and suppress the reinforcing fiber bundle 14 from meandering. The reinforcing fiber bundle 14 is placed on the suction table 16, while being pressed against the suction table 16 by the pressing roller 6.

The fiber bundle supply mechanism 2 is operated as described above to feed out the reinforcing fiber bundle 14 to an arbitrary position. At the same time, the cutting mechanism 11 that is movable to an arbitrary position by another slider mechanism 5a different from the slider mechanism 5 is stood by in advance at the destination of the fiber bundle supply mechanism 2. More specifically, a low head die cutter 12 mounted on the cutting mechanism 11 stands by on the suction table 16. In this state, when the fiber bundle supply mechanism 2 and the cutting mechanism 11 are moved closer to each other, the reinforcing fiber bundle 14 is brought into contact with the cutting edge of the low head die cutter 12 serving as the cutting blade and is then pressed against the cutting edge by the pressing roller 6 to be cut off. The pressing roller 6 and the cutting mechanism 11 respectively have pressing mechanisms 7 and 7a configured to control the motions of the pressing roller 6 and the cutting mechanism 11 in positive and negative directions of the Z axis (vertical direction). A piston cylinder or the like may be employed for the pressing mechanisms 7 and 7a.

The suction table 16 denotes a table that provides the attraction (FIG. 6) or suction force (FIG. 2) to keep the position of the placed and cut reinforcing fiber bundle 14 and is placed on the moving table 4. The moving table 4 is movable in positive and negative directions of the X axis by guide rails 13 mounted on the table base 3. The guide rails 13 may be replaced by conveyor belts. On completion of a series of operations from placement to cutting of the reinforcing fiber bundle 14, the moving table 4 is moved by a distance that is identical with the width of the reinforcing fiber bundle 14 in a positive or negative direction of the X axis (may be set in either direction). The reinforcing fiber sheet manufacturing apparatus 1 repeats the above series of operations until completion of placement of the reinforcing fiber bundle 14 in a predetermined shape. This provides a preform of a reinforcing fiber sheet 15.

In the general AFP apparatus or TFP apparatus, a head configured to supply and place the reinforcing fiber bundle is equipped with a mechanism for cutting a reinforcing fiber bundle and a mechanism to feed the cut reinforcing fiber bundle. However, the cutting mechanism 11 may be provided independently of the fiber bundle supply mechanism 2 and configured to be movable on the suction table 16. This configuration does not provide the structure constraint due to the size and the weight of the fiber bundle supply mechanism 2. The reinforcing fiber bundle 14 is pressed by the pressing roller 6 against the cutting edge of the low head die cutter 12 that is stood by in advance to be cut off. This configuration significantly facilitates cutting. This configuration does not restrict the moving speed of the fiber bundle supply mechanism 2 and enables the reinforcing fiber bundle 14 to be cut accurately even at a high moving speed. The reinforcing fiber sheet manufacturing apparatus 1 can thus place the reinforcing fiber bundle 14 quickly and efficiently.

FIGS. 3A to 3C are partial enlarged views illustrating a process of cutting the reinforcing fiber bundle according to the example. As described above, the pressing roller 6 brings the reinforcing fiber bundle 14 into contact with the low head die cutter 12 so that the reinforcing fiber bundle 14 is cut off.

More specifically, as shown in FIG. 3A, the low head die cutter 12 stands by in advance on the suction table 16. The pressing roller 6 of the fiber bundle supply mechanism 2 is moved closer to a location where the low head die cutter 12 stands by, while pressing the reinforcing fiber bundle 14 against the suction table 16. As shown in FIG. 3B, the pressing roller 6 of the fiber bundle supply mechanism 2 subsequently passes through the location where the low head die cutter 12 stands by to cut off the reinforcing fiber bundle 14. More specifically, the pressing roller 6 is brought into contact with the low head die cutter 12 so that the reinforcing fiber bundle 14 placed between the pressing roller 6 and the low head die cutter 12 is cut off. As shown in FIG. 3C, the pressing roller 6 is kept running for some time after cutting so that a cut end of the reinforcing fiber bundle 14 is placed below the pressing roller 6. In this state, the roller 6 is moved up by the pressing mechanism 7. This keeps the state that the end of the reinforcing fiber bundle 14 is placed below the roller 6. When the fiber bundle supply mechanism 2 is moved in the negative direction of the Y axis and reaches a desired position, the roller 6 is moved down by the pressing mechanism 7. This motion restarts the operation of placing the reinforcing fiber bundle 14 on the suction table 16. This configuration causes the end of the reinforcing fiber bundle 14 to be placed below the roller 6 and accordingly does not need to additionally feed the reinforcing fiber bundle 14 by another mechanism. Accordingly this configuration can start an operation of placing a next reinforcing fiber bundle 14 on the suction table 16 without requiring any additional process of placing the reinforcing fiber bundle 14 below the roller 6. This eliminates an extra time for feeding the reinforcing fiber bundle 14 and thereby improves the production capacity. This configuration also does not need to separately provide a mechanism for feeding the reinforcing fiber bundle 14 and thereby reduces the equipment cost required for separately providing this feeding mechanism.

Figure 4:
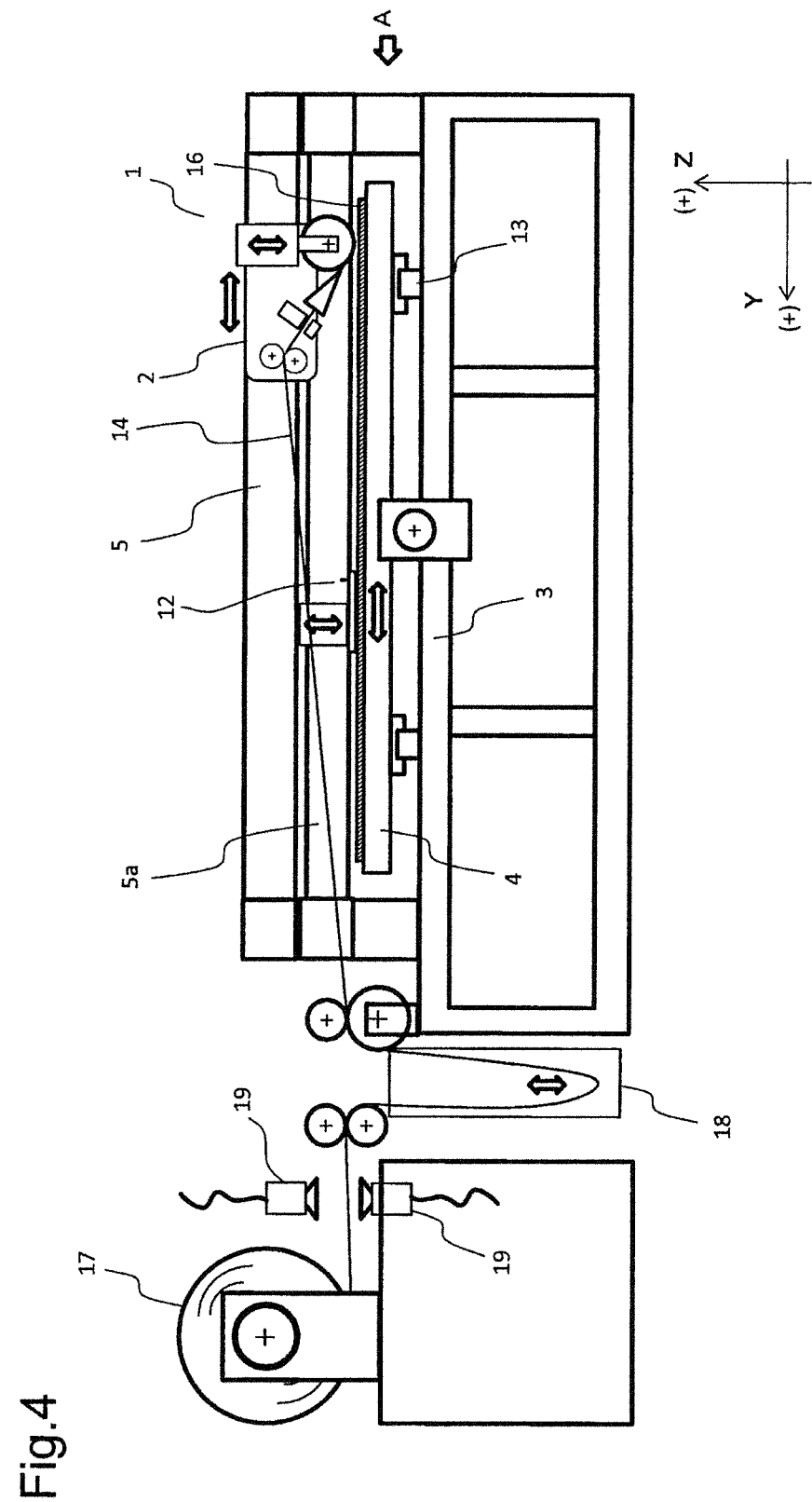
FIG. 4 is a schematic overall view illustrating the reinforcing fiber sheet manufacturing apparatus according to the example.

FIG. 4 is a schematic overall view illustrating the reinforcing fiber sheet manufacturing apparatus 1 according to the example. The reinforcing fiber sheet manufacturing apparatus 1 includes an accumulation mechanism 18 configured to smoothly feed the reinforcing fiber bundle 14 from a reinforcing fiber bobbin 17 which the reinforcing fiber bundle 14 is wound on, to the fiber bundle supply mechanism 2. The accumulation mechanism 18 stabilizes the tension of the reinforcing fiber bundle 14 and quickly supply the reinforcing fiber bundle 14 for the purpose of preventing inversion of the surface and the rear face of the reinforcing fiber bundle 14, when the fiber bundle supply mechanism 2 is moved in the Y-axis direction at a high speed by the slider mechanism 5.

This accumulation mechanism 18 uses air to adjust the slack amount of the reinforcing fiber bundle 14 and smoothly follow the motion of the reinforcing fiber bundle 14 even when the reinforcing fiber bundle 14 is pulled out at a high speed. A different technique other than the above technique using the air, for example, a technique using a light-weight dancer roll or a technique using a floating roll based on the electromagnetic force or the like may be employed for the accumulation mechanism 18 to smoothly follow the motion of the reinforcing fiber bundle 14 even when the reinforcing fiber bundle 14 is pulled out at a high speed.

To supply the reinforcing fiber bundle 14 stably from the reinforcing fiber bobbin 17 to the accumulation mechanism 18, a preferable configuration may observe the rear face and/or the surface of the reinforcing fiber bundle 14 with a camera 19. According to this example, the rear face and the surface of the reinforcing fiber bundle 14 are observed with cameras 19. The cameras 19 are used to check for adhesion of any foreign substance and the like on the reinforcing fiber bundle 14 and for the occurrence or non-occurrence of inversion of the reinforcing fiber bundle 14. More specifically, it is difficult to observe the state of the rear face of the reinforcing fiber bundle 14 after placement on the suction table 16. When the reinforcing fiber bundle 14 is separated from the suction table 16 for observation, there is a need to accurately place the reinforcing fiber bundle 14 again on the suction table 16. In this case, there is a possibility that the surface of the suction table 16 is damaged. Accordingly, it is especially preferable to provide the camera 19 for observing the rear face of the reinforcing fiber bundle 14 and monitor the state of the rear face.

Figure 5:
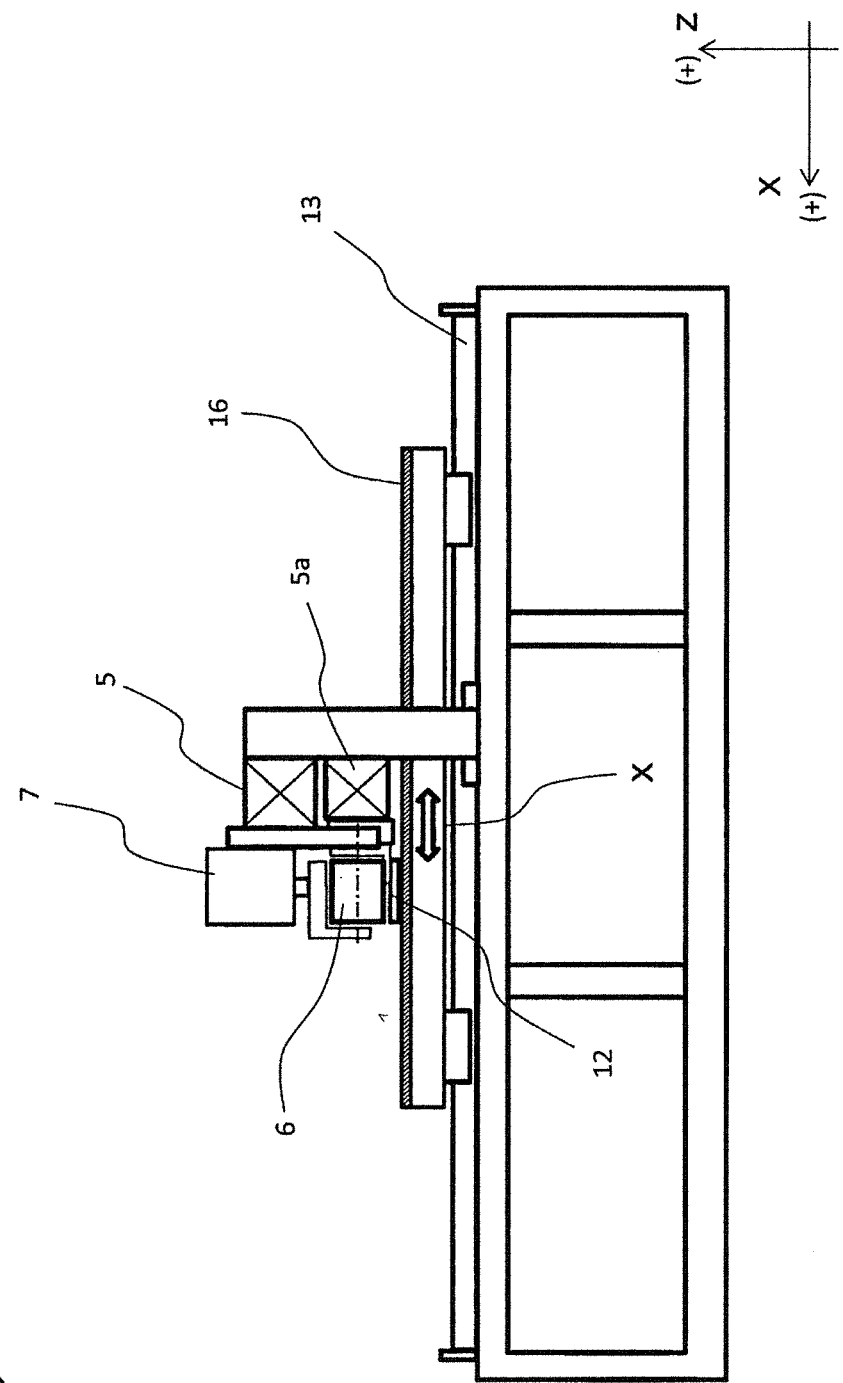
FIG. 5 is a schematic overall view illustrating the reinforcing fiber sheet manufacturing apparatus according to the example.

FIG. 5 illustrates the reinforcing fiber sheet manufacturing apparatus 1 viewed from a direction A shown in FIG. 4. The reinforcing fiber sheet manufacturing apparatus 1 is equipped with (i) the slider mechanism 5 configured to move the fiber bundle supply mechanism 2 in the depth direction of FIG. 5 (direction perpendicular to the sheet surface) (positive and negative directions of the Y axis); and (ii) the slider mechanism 5a arranged approximately parallel to the slider mechanism 5 and configured to move the cutting mechanism 11 in the same direction (direction perpendicular to the sheet surface) (positive and negative directions of the Y axis). Since the reinforcing fiber sheet manufacturing apparatus 1 is equipped with the slider mechanism 5 and the slider mechanism 5a, the cutting edge of the low head die cutter 12 mounted on the cutting mechanism 11 may be arranged to overlap with a projection plane of a lower face of the pressing roller 6 mounted on the fiber bundle supply mechanism 2 onto the suction table 16. This arrangement enables the pressing roller 6 to come into contact with the cutting edge of the low head die cutter 12 when the pressing roller 6 is moved down. This configuration causes the reinforcing fiber bundle 14 supplied by the fiber bundle supply mechanism 2 to be placed between the pressing roller 6 and the low head die cutter 12 and cut off at the location where the pressing roller 6 comes into contact with the cutting edge of the low head die cutter 12. Linear sliders are illustrated as the slider mechanisms 5 and 5a in FIGS. 2, 4, and 5. The linear sliders may, however, be respectively replaced with robot arms.

When the reinforcing fiber bundle 14 is pulled out, each reinforcing fiber bundle 14 may not be necessarily linear from the starting point to the end point. As long as adjacent reinforcing fiber bundles 14 are kept substantially parallel to each other in microscopic regions, the reinforcing fiber bundle 14 may be arranged to be curved entirely and/or partially in an arc shape.

According to the example, the cutting mechanism 11 provided with the low head die cutter 12 is movable to an arbitrary position in the positive and negative directions of the Y axis by the slider mechanism 5a. According to a simpler configuration, the low head die cutter 12 may be fixed on part of the suction table 16. In this simpler configuration, the pressing roller 6 of the fiber bundle supply mechanism 2 is moved closer to the low head die cutter 12 while pressing the reinforcing fiber bundle 14 against the suction table 16. The reinforcing fiber bundle 14 is cut off when the pressing roller 6 passes through a location where the low head die cutter 12 is fixed. This simpler configuration does not require the slider mechanism 5a and the like to move the cutting mechanism 11 and thereby simplifies the equipment. This configuration may be employed, for example, for mass production of reinforcing fiber sheets of an identical shape for a short time period, in terms of the equipment cost and the like. This simplifies the equipment. Additionally, the low head die cutter 12 fixed on the suction table 16 may be formed to have a contour identical with a final shape that is a desired shape. This enables the trimming process to the final shape to be completed simultaneously with the cutting process. This accordingly improves the time efficiency of production.

Figure 6:
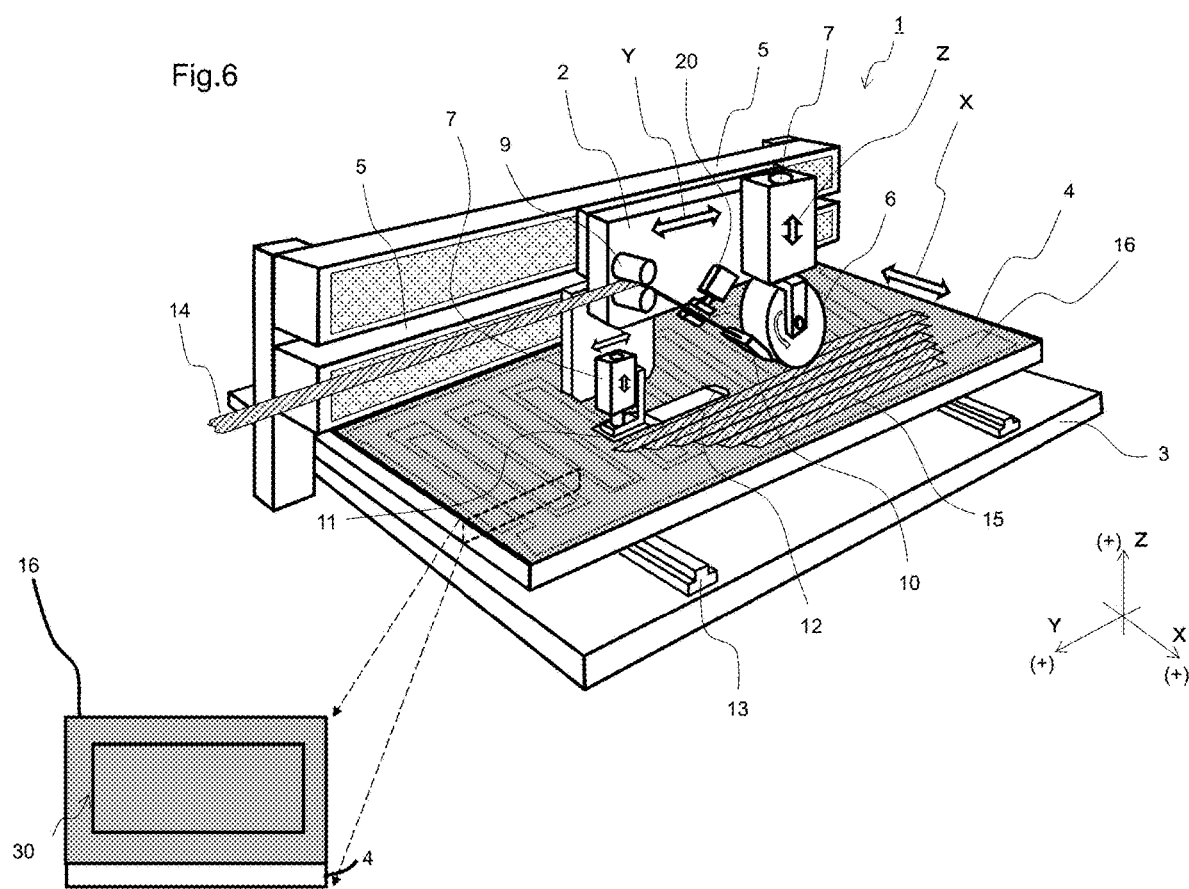
FIG. 6 is a schematic configuration diagram illustrating a reinforcing fiber sheet manufacturing apparatus according to another example.

The suction table 16 as shown in FIGS. 2 and 6 is preferably provided with a function of keeping the position of the reinforcing fiber bundle 14 that is placed. More concretely, the mechanism to maintain the position of the reinforcing fiber bundle 14 may be, for example, an air suction mechanism using air suction (FIG. 2), an electrostatic attraction mechanism 30 using static electricity (FIG. 6), or a mechanism using an adhesive force by an adhesive material or using heat sealing or the like when the reinforcing fiber bundle 14 includes a heat fusion material. The adhesive material is preferably a temperature-sensitive material that provides both adhesion and non-adhesion with a temperature change. The example may employ any of these techniques and may employ some of these techniques in combination.

This example uses the electrostatic attraction force using static electricity as the function of the suction table 16. In this case, the reinforcing fiber bundle 14 is preferably made of a conductive material. Carbon fiber is a good electrical conductor and additionally has high strength and high elastic modulus as the reinforcing fiber. It is thus especially preferable to use the electrostatic attraction force as the function of the suction table 16. In the case of a fiber that does not have electrical conductivity by itself, for example, glass fiber or Kevlar (registered trademark) fiber, adhesion of a surface active agent or the like that reduces the electrical resistance on the surface of the fiber allows for electrostatic attraction.

When the position of the reinforcing fiber bundle 14 is kept on the suction table 16 that uses the suction force by air suction or the electrostatic attraction force, there is no need to separately add an additional material such as thermoplastic tacky material described later to the reinforcing fiber bundle 14. This significantly contributes to reduce the material cost of the reinforcing fiber bundle 14. Additionally, there is no need to provide a treatment time in a post process of fusing the thermoplastic tacky material. There is also no need to provide a large heating system such as a laser irradiation apparatus to fuse the thermoplastic tacky material. This accordingly contributes to reduce the equipment cost.

When using an adhesive material, simple bonding technique may be employed. In such a case, a material providing adhesion at ordinary temperature has difficulty in handling. It is accordingly preferable to use a thermoplastic tacky material that is a heat fusion material providing adhesion only in the heat-melting time. There is a need to separately provide a heating unit such as an IR heater for heat-melting the thermoplastic tacky material. To shorten a heat-melting time, it is preferable to provide a heating system such as a laser irradiation apparatus, an ultrasonic apparatus or a power heating apparatus.

The reinforcing fiber bundles 14 placed on the suction table 16 are bound with one another and fixed by a material such as a binder to keep the shape of the reinforcing fiber sheet 15 and are then separated from the suction table 16. The binder may consist of short fibers, may consist of continuous fibers or may consist of a mixture of short fibers and continuous fibers. The binder used may be any of various forms such as unwoven fabric or film. A material obtained by a melt spray system that sprays a resin melted by a solvent or heat into the air and solidifies the sprayed resin may be used as the binder. When the material obtained by the melt spray system is used as the binder, the method employed may be, for example, (i) a method of directly spraying the material onto a plurality of the reinforcing fiber bundles 14 placed on the suction table 16 to form the binder or (ii) a method of providing the material formed in advance as an unwoven fabric by a separate process and applying the material on a plurality of the reinforcing fiber bundles 14 placed on the suction table 16. The reinforcing fiber sheet 15 may be formed from the plurality of reinforcing fiber bundles 14 and the binder by any of these methods. The amount of the binder used to bind the plurality of reinforcing fiber bundles 14 is not specifically limited but is preferably such an amount that causes the obtained reinforcing fiber sheet 15 to exert the shape-forming property.

According to the above example, the low head die cutter 12 is used as the cutting blade. This disclosure is, however, not limited to this example. The cutting blade may be any blade that can cut the reinforcing fiber bundle 14.

INDUSTRIAL APPLICABILITY

Our apparatus is especially suitable for production of a large fiber-reinforced plastic molded product such as an automobile or aircraft and provides a reinforcing fiber sheet used to produce a preform in a three-dimensional shape that is required for manufacture of a fiber-reinforced plastic.

This application claims priority of JP 2014-194593, filed on Sep. 25, 2014, the subject matter of which is hereby incorporated by reference.

The invention claimed is:

1. A reinforcing fiber sheet manufacturing apparatus configured to place a reinforcing fiber bundle on a table, the reinforcing fiber sheet manufacturing apparatus comprising:
a fiber bundle supply mechanism configured to feed the reinforcing fiber bundle and equipped with a fiber bundle pressing portion configured to press the reinforcing fiber bundle against the table; and
a cutting blade fixed on the table or mounted on a cutting mechanism configured to be movable to an arbitrary position on the table independently of the fiber bundle supply mechanism and configured to stand by on the table to cut the reinforcing fiber bundle that is pressed by the fiber bundle pressing portion.

2. The reinforcing fiber sheet manufacturing apparatus according to claim 1, wherein the fiber bundle pressing portion is a roller configured to move closer to and farther from the table.

3. The reinforcing fiber sheet manufacturing apparatus according to claim 2, wherein the cutting blade is fixed at an arbitrary position on the table.

4. The reinforcing fiber sheet manufacturing apparatus according to claim 2, wherein the cutting blade is mounted on a cutting mechanism configured to be movable to an arbitrary position on the table.

5. The reinforcing fiber sheet manufacturing apparatus according to claim 2, wherein the table is configured to be movable.

6. The reinforcing fiber sheet manufacturing apparatus according to claim 2, further comprising:
an air suction unit configured to fix the reinforcing fiber bundle on the table.

7. The reinforcing fiber sheet manufacturing apparatus according to claim 1, further comprising:
a plurality of slider mechanisms continued to independently move the fiber bundle supply mechanism and the cutting blade to be approximately parallel to each other.

8. The reinforcing fiber sheet manufacturing apparatus according to claim 7, wherein the table is configured to be movable.

9. The reinforcing fiber sheet manufacturing apparatus according to claim 1, wherein the table is configured to be movable.

10. The reinforcing fiber sheet manufacturing apparatus according to claim 1, further comprising:
an air suction unit configured to fix the reinforcing fiber bundle on the table.

11. The reinforcing fiber sheet manufacturing apparatus according to claim 1, further comprising:
an electrostatic attraction unit configured to fix the reinforcing fiber bundle on the table.

12. The reinforcing fiber sheet manufacturing apparatus according to claim 1, further comprising:
an adhesive material placed between the table and the reinforcing fiber bundle.

13. The reinforcing fiber sheet manufacturing apparatus according to claim 1, further comprising:
a heating unit configured to melt a heat fusion material adhering to a surface of the reinforcing fiber bundle and heat-fuse and fasten the heat fusion material to the table.

14. The reinforcing fiber sheet manufacturing apparatus according to claim 1, further comprising:
a conveyer belt placed on the table.

* * * * *